Jan. 26, 1926.  
S. JOHNS  
PARKING LIGHT  
Filed Feb. 12, 1923
1,570,673
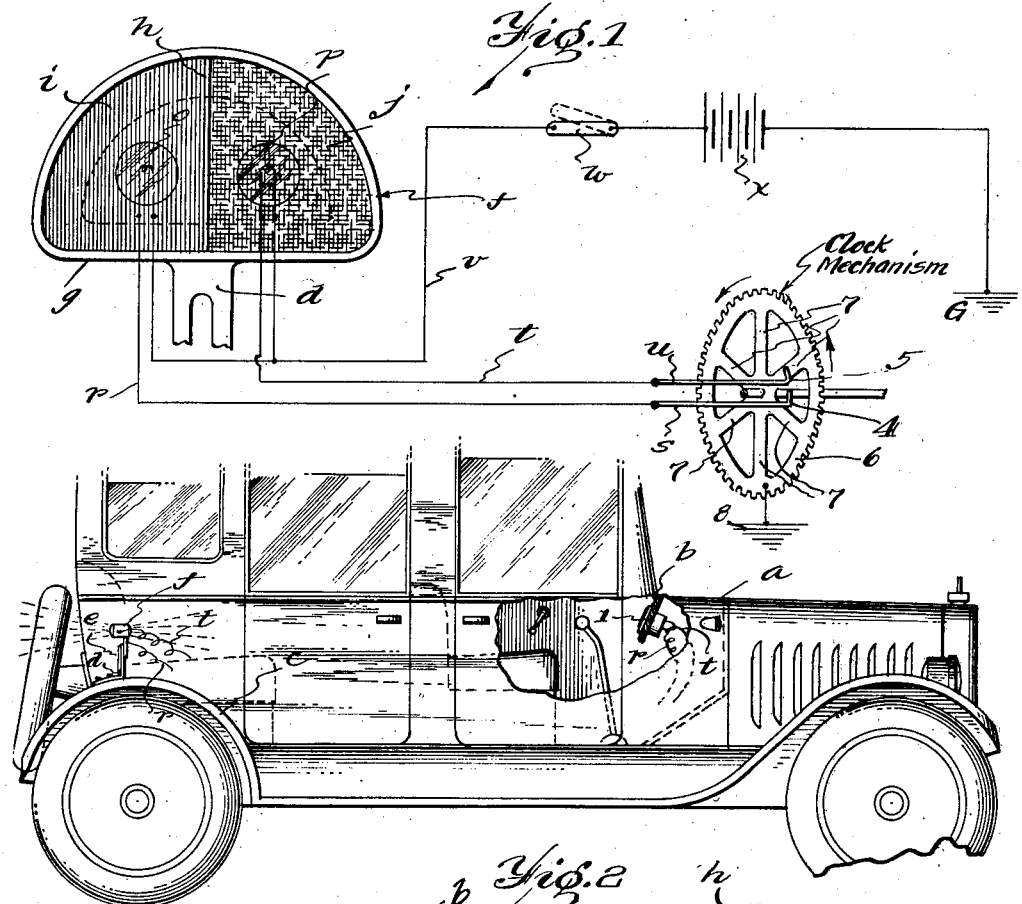
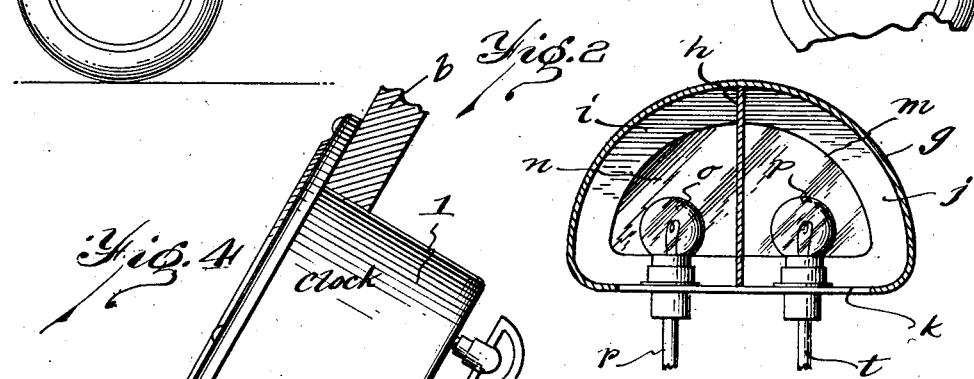
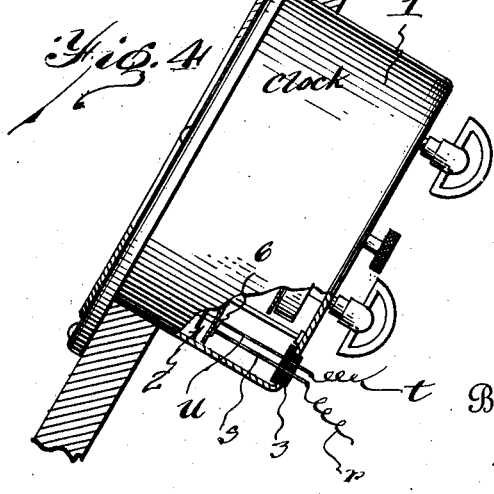
Inventor  
Sam Johns  
By Stuart C. Barnes  
Attorney Patented Jan. 26, 1926.

1,570,673

UNITED STATES PATENT OFFICE.

SAM JOHNS, OF DETROIT, MICHIGAN.

PARKING LIGHT.

Application filed February 12, 1923. Serial No. 618,512.

*To all whom it may concern:*

Be it known that I, SAM JOHNS, a citizen of the United States, residing at Detroit, in the county of Wayne and State of Michigan, have invented certain new and useful Improvements in Parking Lights, of which the following is a specification.

This invention relates to automobile parking lights, the object of which is to provide a parking light in which it is desired to have lights of different colors, alternately flashing when seen from the rear of the automobile and a continuous white light to be viewed from the front of the automobile.

Another object is to provide means for automatically operating this parking light, said means adapted to be attached to a clock that is carried as regular equipment on the instrument board of an automobile.

A further object is to provide means for controlling the electrical circuit to the parking light so that it may be either closed so as to alternately flash the parking light or can be opened so as to entirely disconnect the same.

In the drawings:

Fig. 1 is a diagrammatic view of the electrical circuit including my parking light and the means for controlling the alternate flashing of the same.

Fig. 2 is a side elevation of an automobile, parts being broken away.

Fig. 3 is a transverse section through the parking light.

Fig. 4 is an elevation of the clock mounted on the instrument board, parts being broken away to show the make and break mechanism.

An automobile $a$ is provided with an instrument board $b$ and fenders $c$. A bracket $d$ is carried by the rear fender and is adapted to support the license plate $e$ and the parking light $f$.

The parking light $f$ consists of a casing $g$ provided with a partition $h$ to divide the interior into two separate compartments $i$ and $j$. The compartments $i$ and $j$ are covered by glasses of a different color to similarly color the rays of light passing therethru. As I show in Fig. 1, I provide the compartment $i$ with a glass shaded to represent red and compartment $j$ with a glass shaded to represent yellow. The lower portion of the casing $g$ is provided with an opening $k$ through which the light is adapted to shine upon the license plate $e$. The forward end in the casing $g$ is provided with an opening $m$ covered by a glass $n$ through which the light is adapted to shine to throw a white light forward. Bulbs $o$ and $p$ are supported within the casing $g$, one in each compartment $i$ and $j$ respectively.

The light bulb $o$ is connected by a wire $r$ to the spring contact member $s$. The light bulb $p$ is connected by the wire $t$ to the spring contact member $u$. The light bulbs $o$ and $p$ are connected through the wire $v$ to a switch $w$, battery $x$ and thence to ground.

The instrument board $b$ is provided with a clock 1, provided with the usual clock mechanism 2. In the back face of the clock I insert an insulating plug member 3, through which the spring contact arms $s$ and $u$ are supported. These contact arms $s$ and $u$ are each bent at one end as at 4 and 5 respectively. One of the gears 6 of the clock mechanism 2 having a plurality of spider arms 7, is constantly rotated by the clock mechanism, and the spring contact arms $s$ and $u$ are adapted to make and break the electrical circuit to the parking light by intermittently contacting with these spider arms, referred to as the spaced contacting surfaces.

Referring to Fig. 1 will be seen the diagrammatic layout of the electrical circuit. The clock mechanism is grounded as at 8; the spring contact members $s$ and $u$ are arranged to contact with the spider arms 7 or contacting surfaces of the gear 6 as the said contacting surfaces slide under the bent over contacting portions 4 and 5 of the said spring contact members. In Fig. 1, the contact member $u$ is contacted with one of the spider arms 7, completing the circuit through the wire $t$ and the lamp $p$, thence through the switch $w$, battery $x$ and the ground G. As the clock mechanism is also grounded this will complete the electrical circuit.

On further rotation of the gear 6, the spider arm or contacting surface will be caused to leave the contacting portion 5 of the contact member $u$, thus breaking the circuit through the lamp $p$. Before this circuit is broken the bent over contacting portion 4 of the spring contact member $s$ is caused to come in contact with the next spider arm or contacting surface thereby closing the circuit through the wire $r$, lamp

*c*, and thence through the switch *w*, battery *v*, to ground. The length of the bent over contacting portions 4 and 5 is such that at no time during the operation of the device will both lights be off, since the circuit through one lamp is closed before the circuit through the other lamp is opened.

From the foregoing description it will be seen that I have provided a parking light that is efficiently and positively operated by utilizing the clock mechanism that is carried as equipment on the instrument board of an automobile. The construction of the make and break mechanism is simple and can be easily assembled on to the clock casing. Furthermore this make and break mechanism eliminates the use of an independent motor or the like, as my invention can be co-ordinated with a clock mechanism carried by the automobile as equipment, which I find very suitable, as the moving parts of said clock mechanism are easily accessible.

What I claim is:

1. In a parking light for vehicles, the combination of illuminating means, a housing for said illuminating means provided with light openings at the front and rear thereof, and means for controlling the beams of light projected from said illuminating means, whereby a ray of one colored light is projected forwardly from the housing and alternate lights of different colors are continuously and intermittently projected rearwardly from said housing.

2. In a parking light for vehicles, the combination of a housing divided into two compartments, illuminating means in each compartment, the said compartments provided with light openings at the forward and rear ends thereof, the rear openings each covered with a transparent covering each being of a different color, the forward openings covered with a transparent covering of the same color and means for controlling the said illuminating means for intermittently lighting the separate illuminating means in each compartment, said controlling means arranged to alternately actuate the separate illuminating means for the purpose of projecting different colored lights from the rear of the housing and a ray of one colored light forwardly of the housing.

In testimony whereof I affix my signature.

SAM JOHNS.